(No Model.) 2 Sheets—Sheet 1.

D. S. STODDARD.
STONE GATHERER.

No. 416,515. Patented Dec. 3, 1889.

Witnesses
C. M. Newman,
Axley I. Munson.

Inventor
David S. Stoddard
By A. M. Wooster
Atty.

(No Model.) 2 Sheets—Sheet 2.

D. S. STODDARD.
STONE GATHERER.

No. 416,515. Patented Dec. 3, 1889.

Witnesses
C. M. Newman,
Arley I. Munson.

Inventor
David S. Stoddard
By F. M. Wooster,
Atty.

UNITED STATES PATENT OFFICE.

DAVID S. STODDARD, OF WATERBURY, CONNECTICUT.

STONE-GATHERER.

SPECIFICATION forming part of Letters Patent No. 416,515, dated December 3, 1889.

Application filed July 18, 1889. Serial No. 317,883. (No model.)

*To all whom it may concern:*

Be it known that I, DAVID S. STODDARD, a citizen of the United States, residing at Waterbury, in the county of New Haven and State of Connecticut, have invented certain new and useful Improvements in Stone-Gatherers; and I do hereby declare the following to be a full, clear, and exact description of the invention, such as will enable others skilled in the art to which it appertains to make and use the same.

My invention has for its object to produce a machine for picking up stones, in which the number of parts and the cost of production shall be reduced to the minimum, the device as a whole being simple, strong, and durable, easily dumped, and practically impossible to get out of repair.

With these ends in view I have devised the novel construction which I will now describe, referring by numbers to the accompanying drawings, forming part of this specification, in which—

Figure 1:
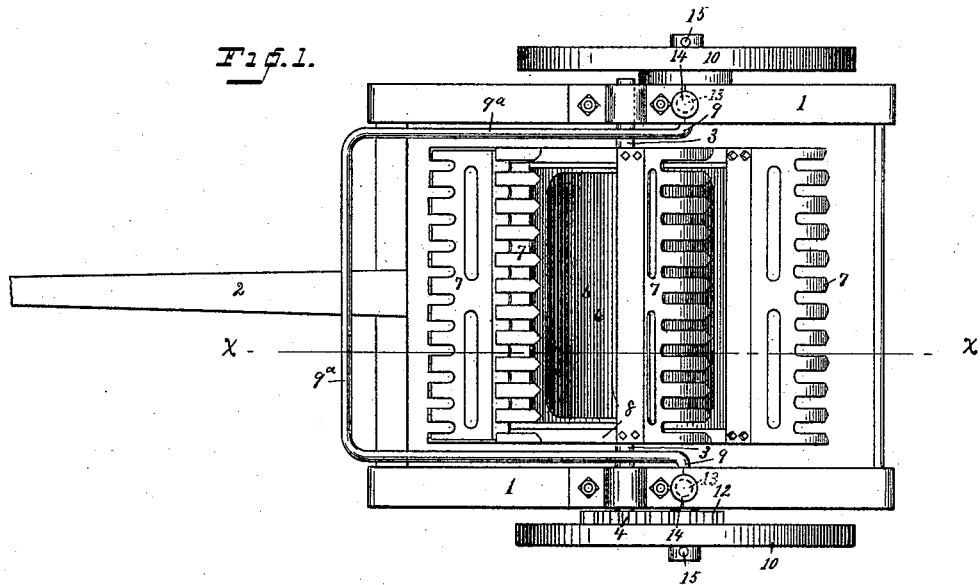
Figure 2:
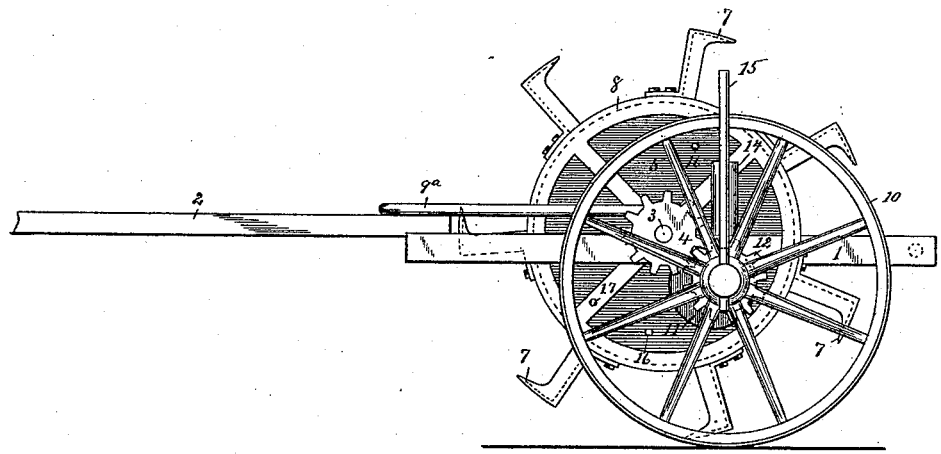
Figure 3:
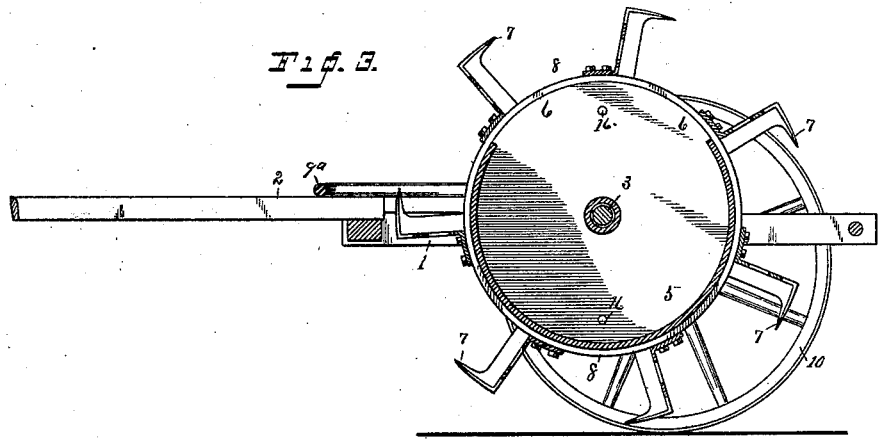
Figure 4:
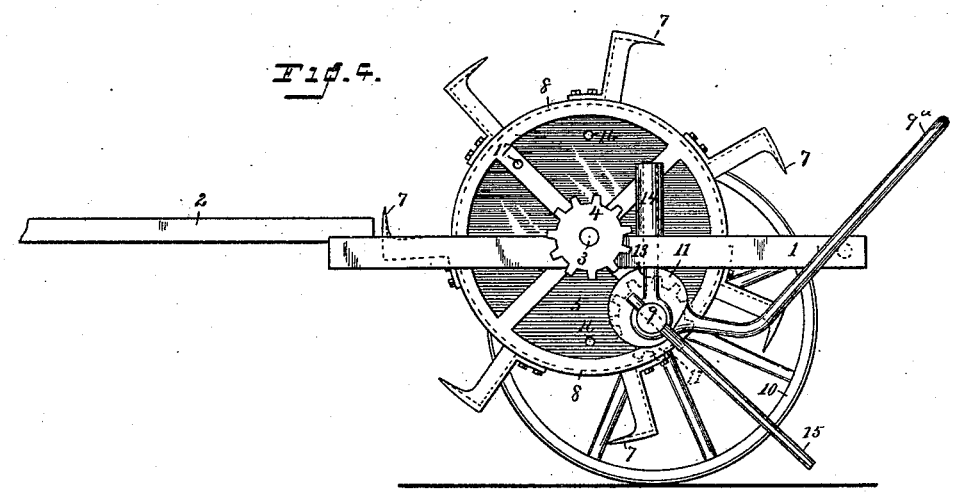

Figure 1 is a plan view of the machine complete; Fig. 2, a side elevation in operative position; Fig. 3, a longitudinal section on the line $x\ x$ in Fig. 1, and Fig. 4 is a side elevation showing the rakes or pickers lifted from the ground, as in passing an obstruction.

1 denotes the frame of the machine, which may be of any suitable or preferred construction and of metal or wood, wood being ordinarily used on account of its lightness and great strength.

In practice the machine may be drawn by one horse or by a team, depending upon the size of the machine and the class of ground on which it is used.

In the drawings I have shown a pole 2 for the attachment of a team, the evener and whiffletrees not being shown.

3 denotes a shaft suitably journaled in the frame and provided at one end, either inside of the frame or outside, as shown, with a gear 4.

5 denotes a receiver, preferably cylindrical in form, which is provided with an opening 6 at the top and is mounted loosely on the shaft, leaving the latter free to rotate independently of the receiver.

7 denotes pickers or rakes, which are rigidly secured to the axle in any suitable manner. In the drawings I have shown the pickers as cast in the form of rakes or strips of hooked teeth, the ends of each strip being rigidly secured to the periphery of skeleton disks 8, which are themselves rigidly secured to the shaft just outside of the receiver.

9 denotes the axle, and 10 the wheels. The shape of the axle will be clearly understood from Figs. 1 and 4. It will be seen that, instead of extending straight across from side to side, each end of the axle just within the frame is curved upward over the shaft, then forward and across at the front above the shaft and pole, forming a loop $9^a$. Each end of the axle is provided with a cam 11, bearing upon the under side of the frame, (see Figs. 2 and 4,) the action of these cams being to raise the frame and all the parts carried thereby when the loop is turned backward, as in Fig. 4. Upon the inner side of one or both of the wheels, (one only as shown in the drawings,) and formed integral therewith or rigidly secured thereto, is a gear 12, which is adapted to mesh with gear 4 when the parts are in operative position, thereby imparting rotation to the shaft which carries the rakes or pickers.

13 denotes pins which project upward from the axle just inside of the wheels, said pins being rigidly secured to the axle, but having no connection with the wheels. These pins serve as guides for the frame, each pin passing through one of the side pieces of the frame, the latter being ordinarily provided with a closed sleeve 14, covering the pin, as shown in the drawings.

In addition to loop $9^a$ on the axle, I ordinarily provide a lever 15 at one of the extreme outer ends thereof, by which to turn the axle, and thereby raise the frame and the parts carried thereby, if more convenient for the operator than to lift the loop.

16 denotes holes in the ends of the receiver; and 17 corresponding holes in the skeleton disks. When it is desired to dump the receiver, a pin (not shown) is passed through two corresponding holes 16 and 17, thereby locking the receiver to the skeleton disks.

The operation of the entire machine is as follows: When in operation, the parts are in the position relatively to each other, shown in Figs. 1, 2, and 3. As the machine is drawn forward the rotation of the wheels, through gears 4 and 12, impart rotation to the skeleton disks carrying the rakes or pickers. It will of course be understood that these rakes may be made in various ways, it simply being required that the points thereof pass the required distance into the soil and gather up the surface stones, any soil that may be picked up at the same time dropping through the interstices between the rake-teeth, and also through interstices ordinarily formed in the bodies of the strips when the rakes are cast in the manner illustrated in the drawings. The points of the teeth bend forward sufficiently, so that all of the stones dislodged from the ground are retained and lifted upward by the teeth as the skeleton disks revolve. When any set of teeth that has picked up a stone or stones passes above its mid-position—that is, a position in which the body of the rake or picker teeth is in a plane horizontal with the ground—the stones will roll inward and drop into the receiver through opening 6. It will be noticed that the gears are so placed relatively to each other that the skeleton disks carrying the rakes will revolve continuously so long as the parts are in their normal position. In passing over a stone too large to be picked up, or a stump, or any similar low obstruction, the frame, and with it the shaft, receiver, rakes, &c., are raised to the position shown in Fig. 4, either by power applied to loop 9ª or to lever 15. The raising of the shaft moves the gear upon the shaft out of engagement with the gear upon the axle, so that the pickers stop rotating. As soon as the obstruction is passed the frame, shaft, receiver, &c., are lowered again to the position shown in Fig. 2. This places the gears in engagement again and the operation of picking up stones proceeds as before. When it is not desired that the rake should operate—as, for instance, when the load of stones in the receiver is as heavy as may be thought advisable—the gears are disengaged by lifting the frame, shaft, &c., to the position shown in Fig. 4, the cams being so laid out as to hold the frame, shaft, &c., in the raised position without the operator being required to keep his hand upon the lever or loop. When it is desired to dump the receiver, the operator simply turns the skeleton disks until one of the holes 17 registers with one of the holes 16 in the receiver and locks the parts in that position by a suitable pin. (Not shown.) The frame, shaft, &c., are then lowered to the position shown in Fig. 2, which places the gears in engagement again. As soon as the machine is moved forward the receiver is carried around with the skeleton disks and rakes, and the stones are dumped out through opening 6.

It will of course be apparent that the details of construction may be varied to a great extent without departing from the principle of my invention.

I claim—

1. The frame, a shaft journaled thereon, a receiver loosely mounted on the shaft and having an opening at the top, and a series of rakes suitably secured to the shaft and rotating therewith, in combination with an axle, wheels upon said axle, and gears upon said shaft and one of the wheels, whereby the rakes are caused to rotate around the receiver, the stones gathered by the rakes dropping into the receiver through the opening.

2. The combination, with the axle, wheels, and a gear on one of the wheels, of a frame, a shaft mounted thereon and having a gear engaging the gear on the axle, a receiver loosely mounted on the shaft and having an opening at the top, and a series of rakes rigidly secured to the shaft and rotating about the receiver, as and for the purpose set forth.

3. The frame, a shaft mounted thereon, a receiver loosely mounted on the shaft, and a series of rakes secured to the shaft and rotating about the receiver, in combination with an axle having a loop lying above the shaft, and cams engaging the under side of the frame, whereby when the loop is swung backward a partial rotation is imparted to the axle, causing the cams to lift the frame and the parts carried thereby.

4. The frame, a shaft mounted thereon and having a gear 4, a receiver loosely mounted on the shaft, and a series of rakes secured to the shaft and rotating about the receiver, in combination with an axle having a loop lying above the shaft, cams engaging the under side of the frame, and the wheels, one of which is provided with a gear adapted to engage gear 4, whereby when the loop is swung backward a partial rotation is imparted to the axle, causing the cams to lift the frame and throwing the gears out of engagement.

5. In a machine of the class described, an axle having a loop 9ª, cams 11, and pins 13, in combination with a frame engaging said pins and adapted to be engaged by the cams, a shaft mounted on the frame, a receiver loosely mounted on the shaft, and a series of rakes carried by the shaft and adapted to rotate about the receiver.

6. In a machine of the class described, the combination of an axle having a loop 9ª, cams 11, and pins 13, a frame engaging said pins, a shaft mounted on said frame, a receiver loosely mounted on the shaft, and a series of rakes carried by said shaft and rotating about the receiver.

7. In combination, an axle having a loop 9ª and cams 11, wheels mounted on said axle, one of which is provided with a gear 12, a frame adapted to rest on the cams, a shaft mounted in said frame and having a gear engaging gear 12, a receiver carried by said shaft, and a series of rakes on said shaft adapted to rotate about the receiver.

8. The axle and frame, substantially as described and shown, in combination with a shaft mounted on the frame, a receiver loosely mounted on the shaft and having holes 16, the rakes, and skeleton disks by which they are carried, and which are provided with holes 17, so that said disks and the receiver may be locked together when it is required to dump the latter in use.

In testimony whereof I affix my signature in presence of two witnesses.

DAVID S. STODDARD.

Witnesses:
   DANL. F. WEBSTER,
   CHARLES J. GRIGGS.